United States Patent [19]
Spragg et al.

[11] 3,979,593
[45] Sept. 7, 1976

[54] DETECTOR FOR MEASURING A RADIOISOTOPE TRACER GAS

[75] Inventors: Walter Thomas Spragg, Sutherland; Brian William Seatonberry, San Souci, both of Australia

[73] Assignee: Australian Atomic Energy Commission, Coogee, Australia

[22] Filed: Aug. 19, 1974

[21] Appl. No.: 498,869

Related U.S. Application Data

[63] Continuation-in-part of Ser. No. 344,034, March 22, 1973, Pat. No. 3,866,057.

[52] U.S. Cl. .............................................. 250/364
[51] Int. Cl.² ........................................ G01T 1/20
[58] Field of Search ................... 250/328, 361–369

[56] References Cited
UNITED STATES PATENTS 3,551,674   12/1970   Strindehag ........................ 250/361
3,560,741    2/1971   Strindehag ........................ 250/361
3,590,247    6/1971   Holford ............................. 250/362
3,726,599    4/1973   Neary ............................... 250/361

*Primary Examiner*—Davis L. Willis
*Attorney, Agent, or Firm*—Haseltine, Lake & Waters

[57] ABSTRACT

The present invention is a detector suitable for an apparatus for the absolute measurement of the mass flow rate of a gas by injecting a radioactive tracer isotope, with a known activity relative to a standard, into the flowing gas and measuring the activity when a small sample representative of the flowing gas is removed at a sampling point downstream of the injection point at a sufficient distance to ensure a homogeneous mixture of the tracer isotope with the flowing gas.

1 Claim, 12 Drawing Figures

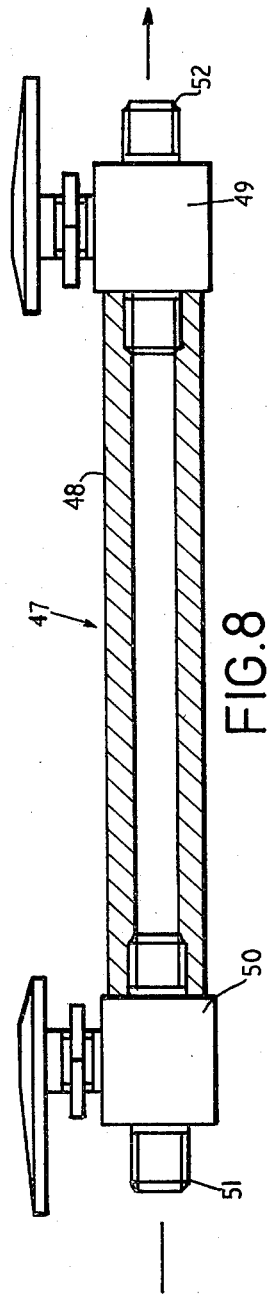
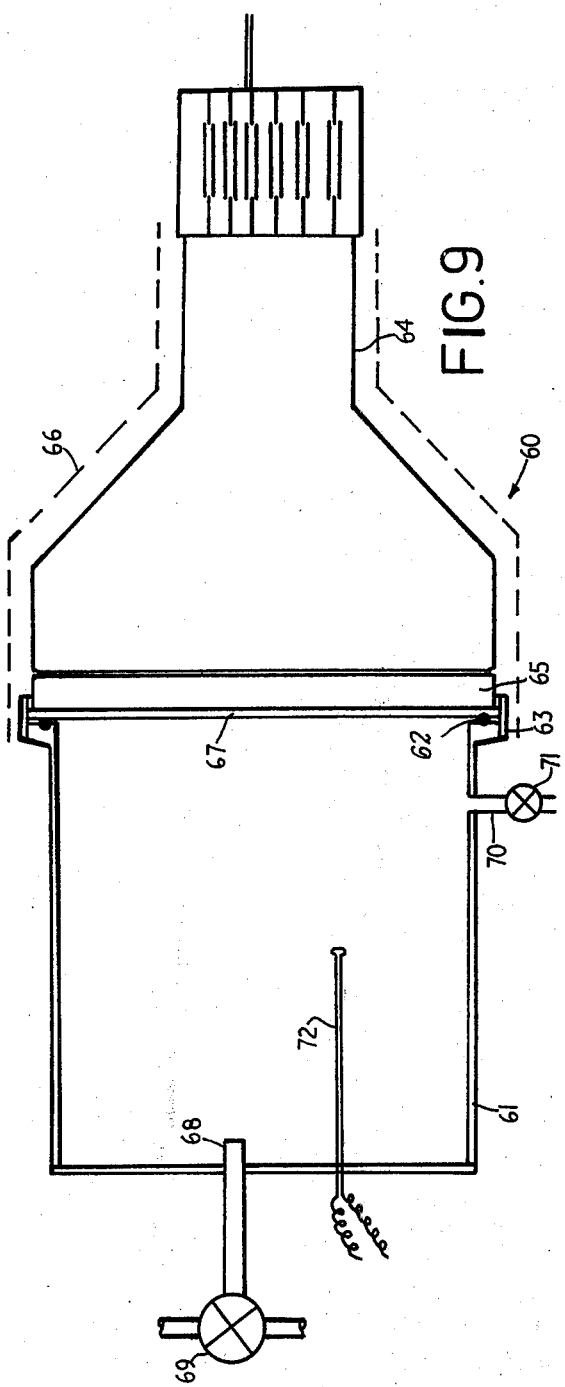

DETECTOR FOR MEASURING A RADIOISOTOPE TRACER GAS

The present application is a continuation-in-part of the parent application Ser. No. 344,034, filed Mar. 22, 1973, now U.S. Pat. No. 3,866,057.

The present invention relates to the absolute measurement of the mass flow rate of a gas in a pipe or duct, which is an important requirement in commerce, particularly in the petroleum, chemical and natural gas industries.

It is well known that processes for gauging the quantity of flowing fluids can be separated into five main types; (1) using meters that measure the velocity of the fluid directly; (2) using meters that measure the fluid flow by recording the pressure drop when the flow is constricted; (3) using meters that measure the flow by observing the area required for a given flow to take place; (4) using meters that are suitable only for open streams; and (5) using tracer methods.

Metering processes require a knowledge of the pipe diameter and the resistance to flow, which often cannot be predicted in practice. For instance, with a town gas reticulation system, deposits on the wall of the pipe reduce the internal diameter of the pipe and alter the frictional resistance to gas flow. Further sources of error in all metering devices arise from temperature and pressure changes. A temperature change of 1° C. can cause an error of 0.33 per cent and when pipelines are exposed to the elements, a simultaneous measurement of temperature is necessary to enable a meaningful estimation of the quantity of flowing gas.

Methods for the volume measurement of gas flow using a radioactive trace material introduced into the flowing gas are practised by (i) continuous injection and continuous monitoring, (ii) a pulse technique followed by total count and (iii) a pulse technique followed by a collection of a total sample. Each of the processes (i) to (iii) will be familiar to those skilled in the art.

An apparatus and method has now been developed for the absolute measurement of the mass flow rate of a gas by injecting a radioactive tracer isotope with a known activity relative to a standard, into the flowing gas and measuring the activity when a small sample representative of the flowing gas is removed at a sampling point downstream of the injection point at a sufficient distance to ensure a homogeneous mixture of the tracer isotope with the flowing gas. The measured activity may then be used to determine the mass flow rate of the gas.

The technique developed to measure gas flow rates in pipelines relies on a measurement of the time taken by a "tagged" volume of gas to pass a given point, the magnitude of the tagged volume being determined by first injecting a concentrated charge of radioactive gas into it, and then measuring the extent to which the charge is diluted. The main flow of gas may be left relatively undisturbed, with the dilution being determined from a small sample taken so that it is representative of the main gas flow at every instant in terms of the concentration of tracer. When this sample is mixed, the concentration of tracer will be the same as if the whole tagged volume itself has been diverted from the gas flow line and allowed to mix to a uniform concentration of tracer.

A cartridge having a fixed-volume chamber is filled (at known temperature and pressure) with radioactive gas and discharged into a large drum which may be air filled and the volume of which is known accurately. The contents of the drum are mixed to uniformity, and a small sample of the resultant gas mixture is used to fill a further fixed and known volume forming the sample chamber of a gas radioactivity detector according to the present invention. The number of counts registered per unit time is then a function of the activity of the gas, which was loaded into the cartridge, when diluted to a known volume. To determine the magnitude of an unknown gas-filled volume, the cartridge is refilled with the radioactive gas which is then discharged into the unknown gas-filled volume, a sample of the gas mixture is taken and placed in the sample chamber of the detector, and the count rate noted. If the known and unknown volumes of the diluted gas mixtures are the same, the count rates of the respective samples will be the same; if the volumes are different, the count rates will be inversely proportional to the volumes. The cartridge need not always be refilled at the same temperature and pressure, provided that the actual values of temperature and pressure are known, or can be computed. Further, it is preferable to have different pressures where vastly different known and unknown volumes are being compared, so that the concentrations of activity in the samples may be kept roughly to the same order. Similarly, the temperature and pressure conditions in the detector chamber according to the present invention may be altered, provided that these conditions are known and accounted for when computing the final result. Different cartridges can be interchanged if their storage chambers have identical volumes to within the experimental error of the whole technique.

The apparatus consists of a gas tight rechargeable cartridge, having a fixed volume chamber for storing a charge of radioactive gas in a reproducible volume, designed and operating to ensure that all the radioactive tracer is discharged into the flowing gas in a pulse of short duration; a means for extracting the representative sample of gas at a constant flow rate, and means for recording the time taken to extract the representative sample, a radioactivity detector according to the present invention having a fixed volume sample chamber and a radiation sensor for measuring the activity of gas sampled relative to the activity of the gas before injection, wherein the detector and cartridge have a known relation in terms of a calibrating count rate registered by the detector when the fixed volume sample chamber is filled with gas derived from dilution of the tracer from the rechargeable cartridge into a vessel of known volume whereby the mass flow rate of the gas in the pipe or duct may be determined by comparing the count rate registered by the detector when the sample chamber is filled with gas from the representative sample with the calibrating count rate.

The invention in one general form is a radioactivity detector comprising a fixed volume enclosure having an aperture, a phosphor light conductive material located in sealing engagement within the aperture, a photomultiplier tube, the enclosure being provided with an inlet and an outlet and the aperture therein being mounted against a window of the photomultiplier tube thereby permitting the activity of a gas within the enclosure to be measured.

The features of construction, combination of the elements and arrangements of parts of an apparatus incorporating the present invention are described by way of example with reference to the drawings, wherein:

FIG. 8 shows a simplified injector cartridge and pressure vessel combination;

FIG. 9 is a diagrammatic representation of a modified detector according to the present invention; and FIG. 10 is a schematic diagram of a gas sample counting system.

Figure 1:
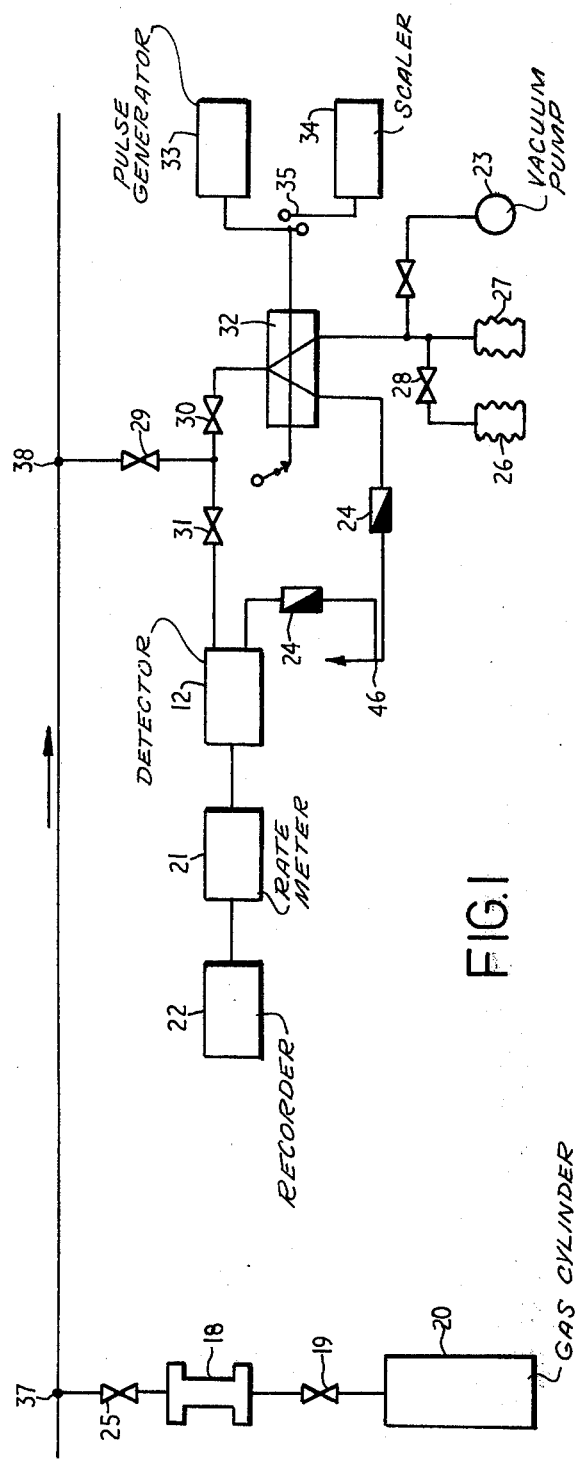
FIG. 1 is a flow diagram of an injection and sampling system, showing the interconnection of parts of the apparatus.
Figure 2:
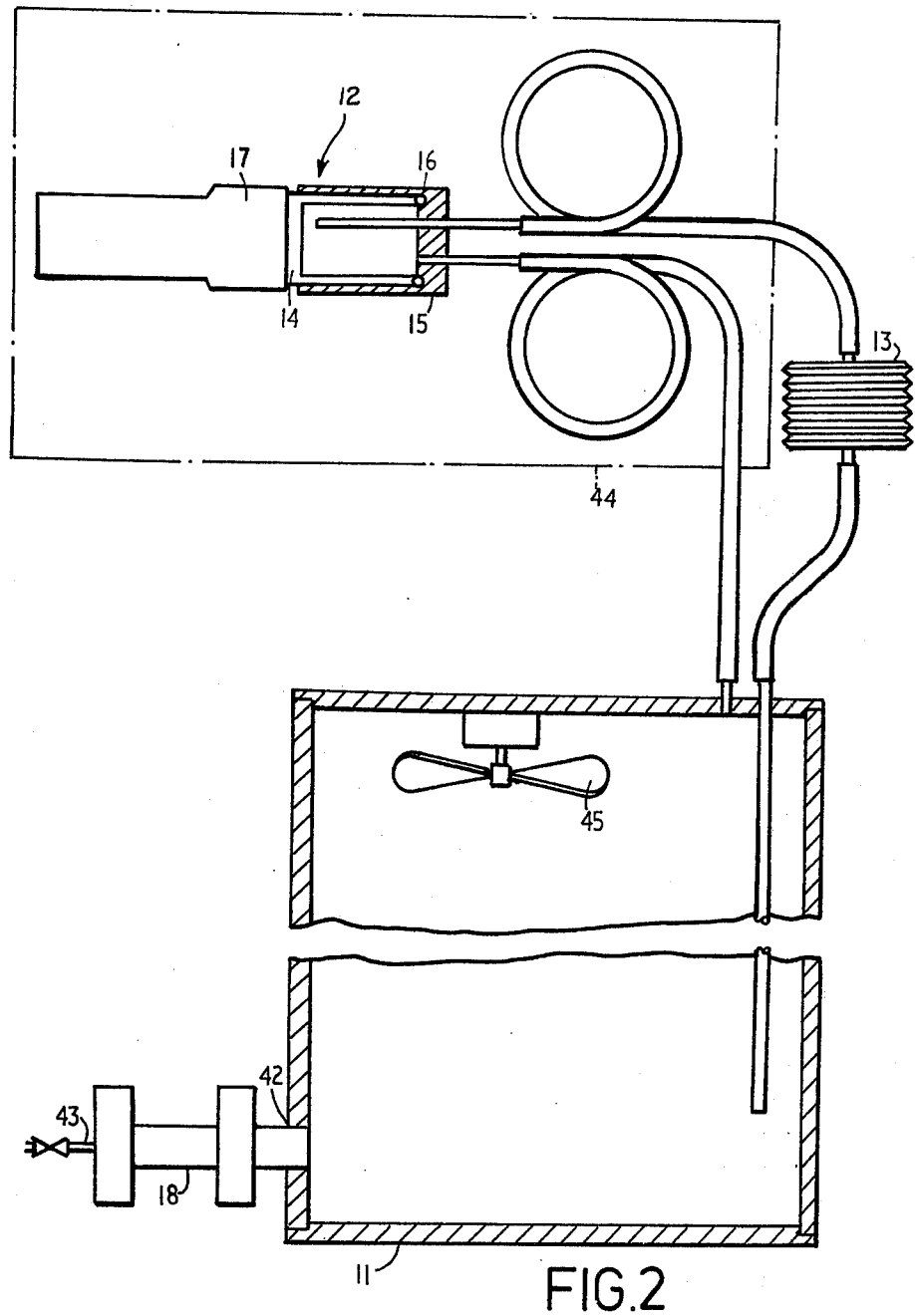
FIG. 2 is a schematic diagram illustrating an injector, a calibration vessel, a detector according to the invention and the interconnection thereof.

The flow diagram, as illustrated in FIG. 1, shows the apparatus required, for the measurement of gas flow in a duct or pipe, the direction of flow being as indicated. The major components, forming the apparatus, are an injector 18, a gas cylinder 20, detector 12, rate meter 21, recorder 22, sampling valve 32, pulse generator 33, scaler 34, flexible sample bags 26 and 27, flow meter 24, and vacuum pump 23. Further the apparatus required to determine the activity of a radioactive tracer gas consists, as illustrated in FIG. 2, of an injector 18, a known volume drum 11, a detector 12 and a pump 13.

Figure 3A:
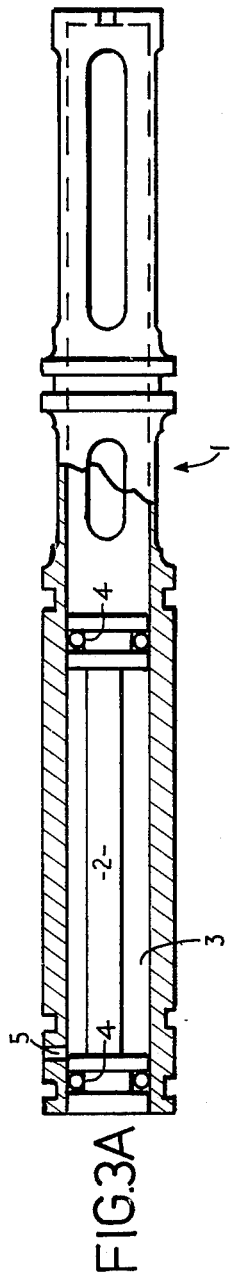
FIG. 3 shows three views, A, B and C, of the injector cartridge, which is part sectioned to illustrate a piston in a first, a second and a third position respectively.
Figure 3B:
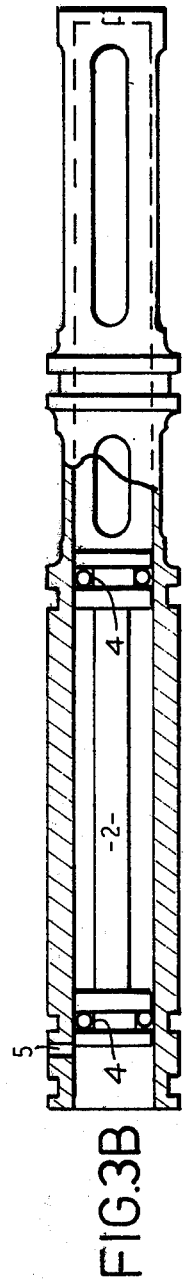
Figure 3C:
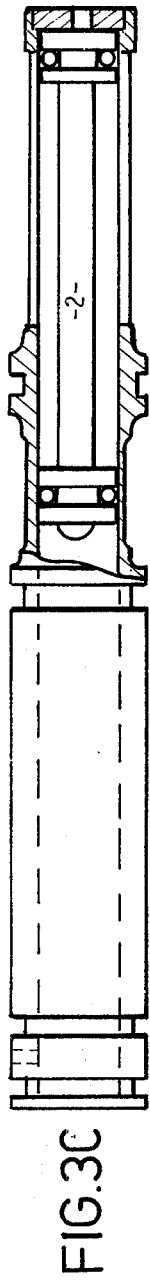
Figure 4:
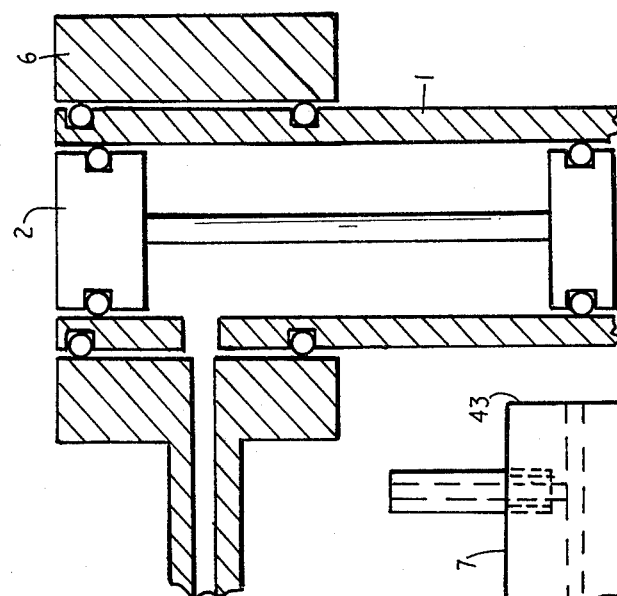
FIG. 4 is a diagrammatic view of a cartridge loading rig.
Figure 6:
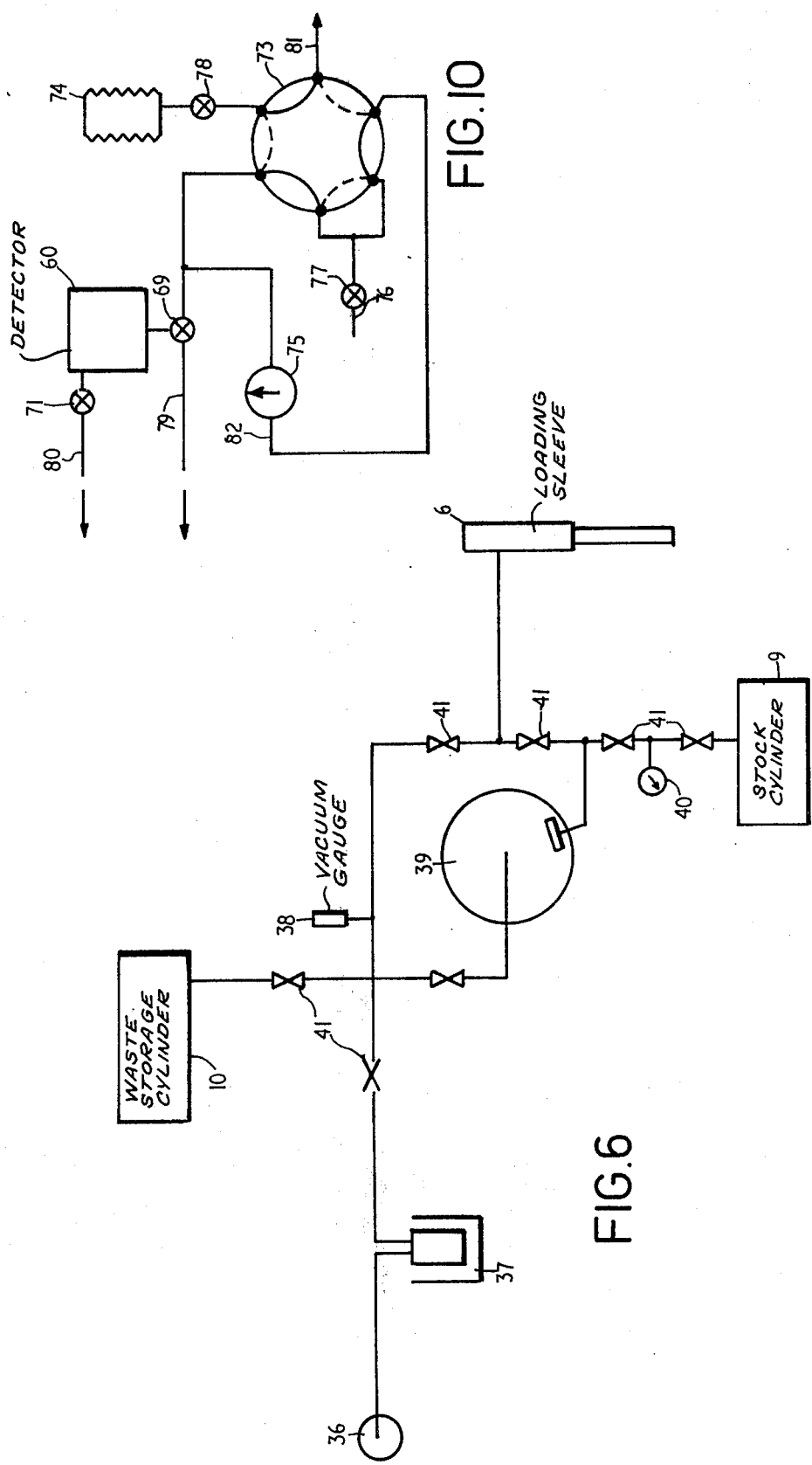
FIG. 6 is a flow diagram of an isotope sample loading system.

FIG. 3 shows the rechargeable injection cartridge 1. The piston 2 is a gas tight sliding fit within the honed and polished cartridge bore 3. The O-ring seatings 4 are reduced in size from British Standard Specification to be a neat fit, thus ensuring a fixed internal volume. The cartridge is loaded with radioactive gas, say krypton-85, by first locating the piston flush with the open end of the cartridge, (FIG. 3A). Krypton-85 can then be introduced into the piston space through a hole 5 using a brass loading sleeve or collar 6, which may be slipped over the end of the injection cartridge as shown in FIG. 4. The loading collar is supplied with gas from a stock cylinder 9 of Kr-85 connected to a vacuum rig as shown in FIG. 6. The vacuum rig, as illustrated in FIG. 6, also includes a vacuum pump 36, a cold trap 37, a pirani or high vacuum pressure gauge 38, differential pressure gauge 39, a pressure gauge 40 for indicating gas pressure in the stock cylinder 9, a waste storage cylinder 10 and valves 41. The total volume of the components of the vacuum rig including the pressure gauges and pump connections, is reduced to a minimum conveniently possible. To minimise loss of stock krypton-85, waste gas is transferred to the waste storage cylinder 10.

Figure 5:
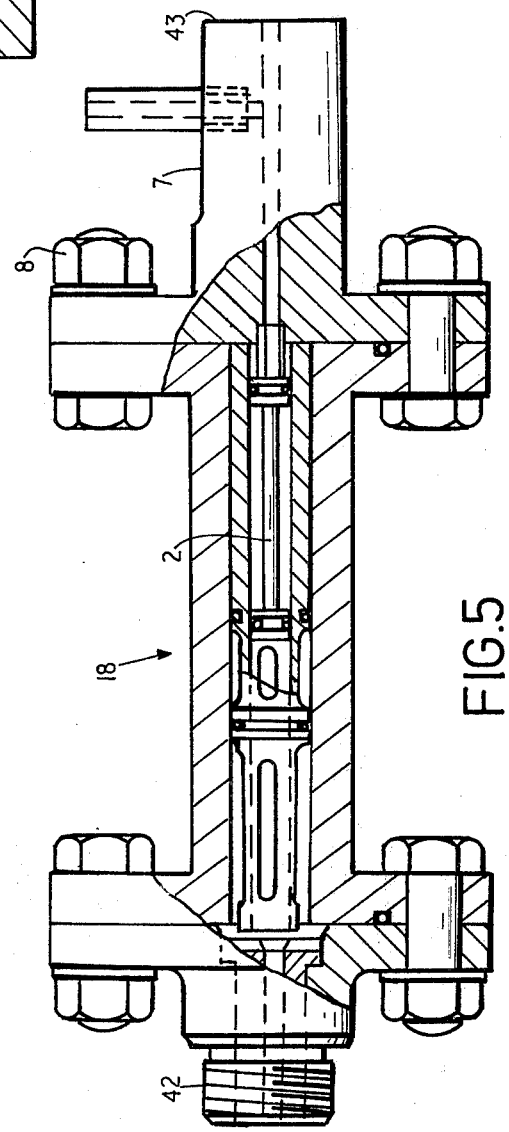
FIG. 5 shows a pressure vessel, part sectioned to illustrate a loaded injector cartridge located therein.

When the injection cartridge is loaded, the piston is moved to the second position shown in FIG. 3B, which seals the gas between the two O-rings. The loaded cartridge is now mounted as in FIG. 5, inside a pressure vessel 18 of wall thickness appropriate to the pressures in use. The top flange 7 of the pressure vessel is then secured with high tensile steel bolts 8. It should be noted that the loaded cartridge can be transported or stored for several days as convenient.

An alternative and simplified form of injection cartridge 47 is shown in FIG. 8 where the cartridge and pressure vessel previously described has been combined as one unit. The simplified injection cartridge 47 comprises a length of pressure tubing 48 of stainless steel or any other suitable material having a "Whitey" type ball valve 49 and 50 at each end thereof. The fixed volume of the cartridge is defined by the internal volume of the tubing between ball valves 49 and 50. The loading collar 6 of the isotope sample loading system illustrated in FIG. 6 is replaced with a corresponding connector suitable for removable connection to either end 51 of valve 50 or end 52 or valve 49 of the simplified cartridge 47.

In operation the cartridge 47 is evacuated by means of vacuum pump 36 to a pressure less than 20 microns. The vacuum line is then isolated and the cartridge filled to a desired pressure with Kr-85 from the stock storage 9. An accurate pressure reading is obtained from differential gauge 39. The cartridge is isolated from storage 9 and removed from the rig.

The apparatus is calibrated in terms of absolute units of measurement. One end 42 of the pressure vessel 18 or alternatively end 52 of simplified injection cartridge 47 is coupled to a calibrated volume drum 11 as in FIG. 2 and the other end 43 of the pressure vessel 18 or end 51 of cartridge 47 respectively to a gas cylinder charged to 3.5 kg/cm$^2$ through a quick release valve. A beta radiation detector 12 and a small recirculating pump 13 are also connected to a vessel or drum 11. The volume of the drum, detector, pump and fittings is accurately measured by methods which will be familiar to those skilled in the art, with the volume of the detector, pump and fittings being added to the calibration volume. One form of beta radiation detector 12 is provided with a plastic phosphor cup 14. Detectors of 200–500 ml capacity using 10 cm long cups of 0.25 cm wall thickness have been used in the examples which are given later. The detector is mounted in an aluminium cup 15 provided with inlet and outlet connections to air, the open end of the plastic cup 14 being sealed to the aluminium cup base by an O-ring 16. The base of the detector plastic cup 14 is mounted against the window of a photomultiplier tube 17. The assembly consisting of the aluminium cup, plastic cup, detector and photomultiplier tube is then spring loaded into a sealed light-proof box 44 which is provided with antivibration supports. Electrical and gas flow connections are mounted externally to the box.

With the detector, recirculating pump and pressure vessel 18 containing the injection cartridge, or alternatively cartridge 47 loaded with krypton-85 at a known pressure and temperature linked to the drum, the fan 45 in the drum is started and the krypton-85 charge fired in to the drum. In the case of pressure vessel 18 containing cartridge 1, the charge is fired only by activating the quick release valve and closing it after 1 to 2 seconds. However in the case of injection cartridge 47, ball valve 49 is first opened to expose the contents of the cartridge 47 to the drum and then followed by opening valve 50. Having opened both valves 49 and 50, quick release valve is activated in the manner described above. The mixed gas in the drum is re-cycled through the detector until complete mixing is assured and the count rate determined. After correcting the applied pressure to a standard temperature and correcting for the dead time of the counter, the count rate is expressed as counts per second at the same standard pressure of the standard drum.

To measure the quantity of gas flowing in a pipe or duct (FIG. 1), two access points 37, 38 to a pipe, or duct, through which the mass flow is to be determined, are required at a sufficient distance apart to ensure adequate mixing. One end 42 of pressure vessel 18 containing a loaded cartridge 1 or alternatively end 52 of cartridge 47 is connected through flexible pressure tubing and couplings to the upstream access point 37. Before coupling to the pipe or duct, polythene sleeving is threaded over the main gate valve 25 and the coupling area and secured to form relatively gas-tight seals separately over both the gate valve and the coupling. This has the advantage that monitoring of the seals can be used to detect any leak of radioactive gas during its injection. The other end 43 of the pressure vessel 18 or 51 of cartridge 47 respectively is coupled through a quick release valve 19 to a high pressure cylinder 20, which has been charged to twice the gas mains pressure, but no less than 3.5 kg cm$^{-2}$ with air or nitrogen.

At the sampling point 38, ratemeters 21 and recorders 22 are connected as shown in FIG. 1. The sampling bags 26 and 27 are 0.125 mm thick polyvinyl chloride and are welded to polyvinyl chloride tubing. Two bags are used to permit thorough mixing of the total sampling before removal to the counting area. A vacuum pump 23 is used to remove air from the sampling bags before sampling commences.

Figure 7:
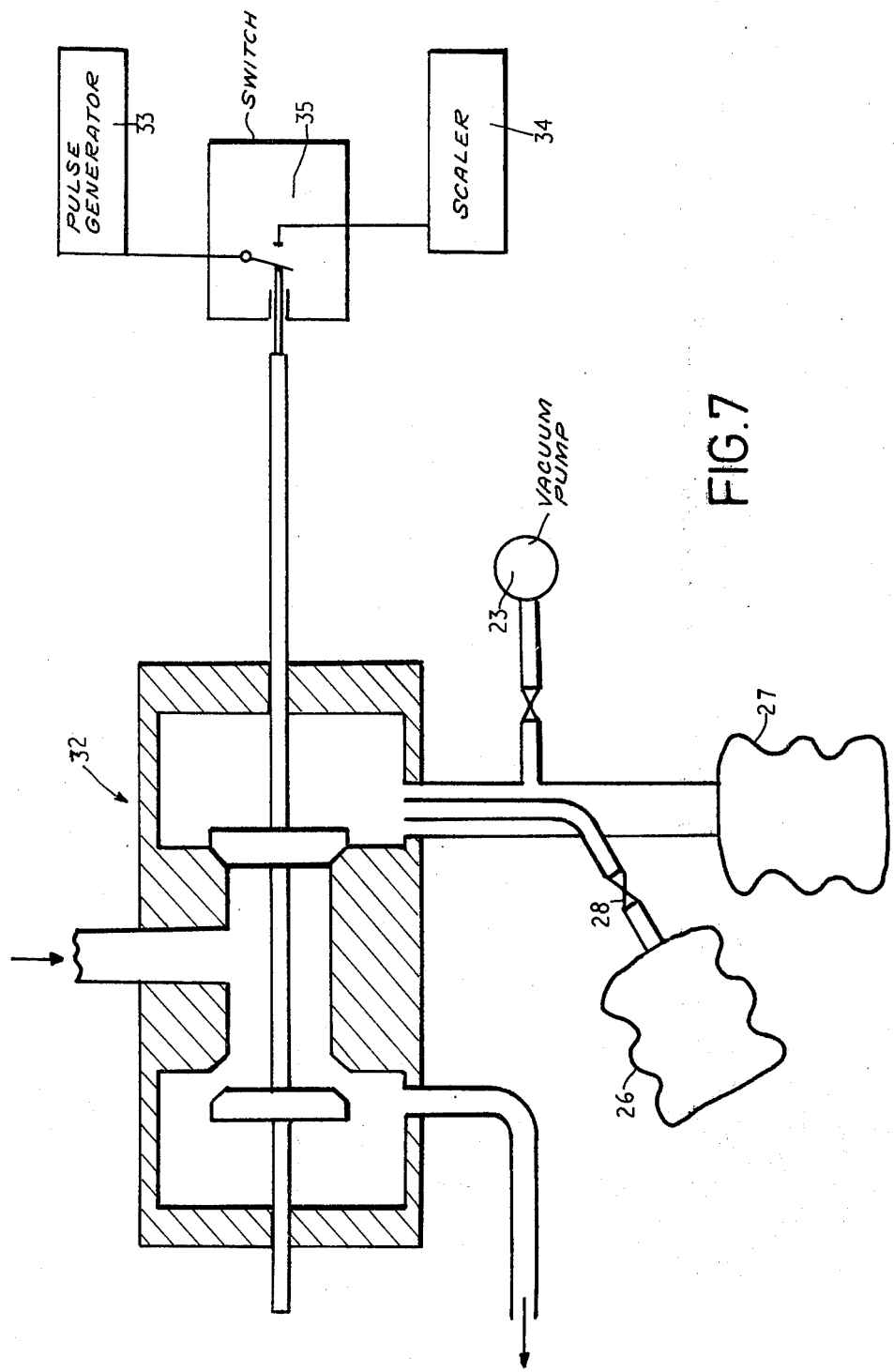
FIG. 7 is a diagrammatic view of a sampling valve and timing switch.

The gas main's valve 29 is opened and the leak rate adjusted at valves 30 and 31 with a small flow meter 24 to ensure a similar leak rate through both detector 12 and sampling valve 32. It should be noted that the detector may also be located, in series, in the sampling line between valves 29 and 30. The cartridge charge is then fired simultaneously with marking the recorder 22 and the velocity of flow to the detector and the pulse shape are checked. Using a monitor, the possibility of leakage into the polythene sleeving surrounding the injection coupling and valve 25 is checked. If no activity is detected and after ensuring that the sampling bags 26 and 27 are evacuated, the first measurement injection is made. Some 2 to 3 seconds before the pulse is due to arrive at the sampling point, the gas flow is diverted from vent 46 to sampling bags using the sampling valve 32 (FIG. 7) and sampling continued until a few seconds after the recorder has returned to background level. The sampling time is recorded using a pulse generator 33 feeding 1 kHz signals to a scaler 34 via switch 35. The gas in the sampling bags is now transferred to one bag 26 and the sample is sealed at valve 28. The sealed bag 26 is then removed and set aside for counting in the laboratory, the removed bag being replaced by a fresh sampling bag. The bags 26 are portable and the samples, which are collected therein, may be stored safely for days, if required. Any number of repeat observations may now be made using further cartridges loaded in the laboratory.

In order to readily accommodate a wide range of activity measurements associated with a wide range of flow rates prevailing in gas mains and the like, an alternative form 60 of constant volume beta radiation detector, as illustrated in FIG. 9, is desirable to allow the counting efficiency to be varied in a known and reproducible manner by use of calibrated scintillating phosphors of known area. A preferred alternative form 60 of detector comprises a lead lined brass cup 61 of 11 cm diameter by 7 cm deep, a photomultiplier 64 having a mumetal shield 66 and an insert 65 of 1.25 cm thick "Perspex" or the like which is lined on one surface with a 0.6 mm film 67 of plastic phosphor (of the type NE102A by Nuclear Enterprises). The cup 61 at one end thereof is provided with a spigot 63 which is sized and shaped to receive the insert 65 with its phosphor lined surface innermost of the cup. An O-ring seal 62 is included to ensure satisfactory sealing between the cup and insert. The brass cup 61 is also fitted with an outlet 68 to a twoway ball valve 69, another outlet 70 to an isolating valve 71 and a thermistor 72 to provide the means of measuring the temperature of a gas sample within the fixed volume cup 61. To alter the detection efficiency, the insert 65 may be replaced by an insert having a phosphor of different area. Each phosphor insert is calibrated against a known standard charge injected into the calibrated volume drum 11 in the manner previously described.

For sample measurement, an arrangement of apparatus as shown in FIG. 10 is preferable, which arrangement includes a six port 3-way valve 73, a bag 74 containing the sample for measurement, sample isolating valve 78, a detector 60 having a two-way valve 69 and isolating valve 71, a differential pressure gauge 75, a vacuum line 76 and vacuum isolating valve 77, gas conduits 79 and 80 from valves 69 and 71 respectively being connected to a standard volume drum 11 if the detector is required for calibration. The sample bag 74 is connected to one port of the six port valve 73, the other ports being connected as shown with the broken lines indicating one valve setting and the full lines another setting. With the valve 73 set as illustrated by the full lines, the detector 60 and pressure gauge 75 are evacuated and some sample gas purged to atmosphere 81. The vacuum line 76 is then isolated and the valve 73 moved through 60° to a setting illustrated by the broken lines, thus allowing the sample gas to fill the detector while one side 82 of the pressure gauge is vented to atmosphere. Preferably the pressure within the detector is maintained at atmospheric pressure by balancing differential pressure reading on gauge 75, as the atmospheric pressure during counting may be accurately obtained from other known sources. The temperature of the gas sample is measured by means of thermistor 72 and the count rate determined over a period of time sufficient to give the required statistical accuracy of counting.

The mass flow rate in kilograms per second is $Q = \rho_p V_p$
where $\rho_p$ is the density of the flowing gas and $V_p$ is the volume of gas in cubic meters per second passing any section of the pipe. Provided the time of sampling of the gas includes the period during which the gas which has been homogeneously mixed with radioactive gas of activity A, passes the sampling point, the mass flow rate on the pipe is:

$$Q = \frac{A}{\Delta A} \cdot \frac{\rho_s V_s}{t} \qquad (1)$$

where $\rho_s$ and $V_s$ are the density and volume of the sample at a specified temperature and pressure, t is the period of time during which the sample was extracted, and $\Delta A$ is the activity of the sample.

The activity of the stock radioactive gas is calibrated in terms of the mass of gas contained by the vessel of known calibrated volume by injecting the contents of a cartridge of constant volume filled to a known pressure and temperature. The total activity in the rechargeable cartridge is proportional to the filling pressure as demonstrated by the results in Table I for repetitive injection of the contents of the rechargeable cartridge into a calibrated volume under temperature conditions.

TABLE I

Calibration of Stock Krypton-85

| Pressure loaded in cm | cps/cm at s.t.p. |
|---|---|
| 12.71 | 66.25 |
| 18.28 | 66.40 |
| 21.98 | 66.40 |
| 27.45 | 66.50 |
| 30.81 | 66.41 |
| 39.97 | 66.45 |

Mean = 66.40
Error $\sigma$ = 0.077 or 0.116 per cent

The count rate C for the gas in the calibrated volume V comprising the calibration vessel, connecting tubing, and the fixed volume, v, of the sample chamber of the radioactivity detector is $$C = A \, \Sigma \, v/V \qquad (2)$$

where $\Sigma$ is the average efficiency of detection of radiation emitted by the radioactive gas in the fixed volume and A is the activity of the mass of gas contained in the rechargeable cartridge.

The count rate $C_s$ for the gas sampled from the pipe line after homogeneous mixing is $$C_s = \Delta A \, \Sigma \, v/V_s \qquad (3)$$

Hence from (1), (2) and (3) the mass flow rate is $$Q = \frac{C}{C_s} \, \frac{\rho_s V}{t} \qquad (4)$$

and the volume flow rate is $$V_p = \frac{C}{C_s} \, \frac{\rho_s}{\rho_p} \, \frac{V}{t}$$

The mass flow rate given by equation (4) is an absolute method being a function only of volume, sampling time and the density of the sampled gas at the temperature and pressure obtaining while it is actually being measured. It is independent of the density of gas in the pipeline at the time of sampling and hence its temperature and pressure.

Use of the apparatus improves on the prior art British Patent Nos. 1,195,229 (1970), 1,186,921 (1970), Canadian Patent No. 842,963 (1970), Brit. Pat. No. 1,140,032 (1969), Canadian Pat. No. 747,483 (1966), U.S. Pat. No. 3,093,739, Brit. Pat. No. 909,013 (1962), U.S. Pat. No. 2,714,168 (1955), Canadian Pat. No. 575,693 (1955), U.S. Pat. No. 2,627,543 (1953), U.S. Pat. No. 2,611,268 (1952), U.S. Pat. No. 1,808,709 (1931), by providing an absolute measure of mass gas flow rate which is independent of pressure and temperature changes in the pipe or duct, of the diameter of pipe or duct and of surface friction caused by roughness of the pipe or duct, and of whether the gas flowing in the pipe obeys laws for an ideal gas.

Absolute methods for the measurement of gas flow have been described by G. V. Evans, R. Spackman and J. C. G. Gardiner ("A Primary Standard of Gas Flow Measurement", AERE-R6011 1969, H.M.S.O., U.K.) and by E. W. Voice, E. B. Bell and P. K. Gledhill ("Radioactive Determination of Gas Flow in Large Ducts", J. Iron and Steel Institute, p.423–427, August 1954).

The present invention overcomes previous disadvantages by making the test measurements relative rather than absolute, re-using fixed volume injection cartridges which have been calibrated relative to a fixed volume detector, and the cartridge/detector combination as a whole being in turn calibrated against a standard volume. The quantity of radioactivity required typically 0.1 microcurie of krypton-85 per 141.5 $M^3$ per hour of gas flow per second of sampling time is much less than the quantity required for applying the radioactive tracer techniques (i), (ii) and (iii) (referred to in page 2 of this specification), which means that the apparatus can be operated industrially using quantities of radioactivity which will not be hazardous to the general public or contribute significantly to environmental pollution.

The use of the apparatus is for the measurement of gas flow in a pipeline at a pressure of 2.067 k Pa is exemplified by the results in Table II in which the flow rates determined were compared in situ with the flow rates recorded by a meter especially calibrated to an accuracy of 0.2 per cent. Table III compares the meter readings for flowing ethylene gas with measurements made using the preferred apparatus.

TABLE II

Flow Measurements $m^3 \, hr^{-1}$

For Air - 2.067 kPa

| Metered Flow | Mean | Measured Flow | Mean |
|---|---|---|---|
| 149.0–149.5 | 149.25 | 149.5 | 149.3 |
|  |  | 148.5 |  |
|  |  | 150.4 |  |
|  |  | 148.8 |  |
| 95.71–96.29 | 96.00 | 96.84 | 96.01 |
|  |  | 95.85 |  |
|  |  | 95.71 |  |
|  |  | 95.65 |  |
| 86.93 | 86.93 | 87.19 |  |
|  |  | 87.05 |  |
|  |  | 86.79 |  |
|  |  | 86.90 |  |

Single Observations

| Metered Flow | Measured Flow |
|---|---|
| 68.81 | 69.04 |
| 66.83 | 67.11 |
| 62.81 | 63.15 |
| 62.86 | 63.20 |
| 66.83 | 67.11 |

TABLE III

Comparison of Integrating Flow Meter Against Absolute Method Ethylene Gas at 3.1 MPa

| | Meter Readings in kg/hr. | | Absolute Measurement in kg/hr. | |
|---|---|---|---|---|
| 1. | 3037 |  | 3063 |  |
| 2. | 3112 | Mean 3079 | 3103 | Mean 3093 |
| 3. | 3089 |  | 3125 |  |
| 4. | 3076 |  | 3076 |  |
| 5. | 2909 |  | 2923 |  |
| 6. | 2908 | Mean 2907 | 2863 | Mean 2897 |
| 7. | 2895 |  | 2841 |  |
| 8. | 2917 |  | 2961 |  |

What we claim is:

1. A beta radioactivity detector comprising a hollow body section of radiation opaque material with an aperture therein, a piece of phosphor light-conductive material located in sealing engagement in the aperture to form a gas-tight fixed volume enclosure, a gas inlet and outlet to the enclosure and a photomultiplier tube with a window mounted against the phosphor light-conductive material in the aperture, whereby the beta activity of a gas in the enclosure causes light generation in the phosphor said light being conducted to the photomultiplier tube, said enclosure comprising a light transparent or translucent phosphor cup of plastics material having a base and at least one side wall, said plastics cup being inserted in a substantially gas tight manner within a metal cup to define said enclosure, the base of the plastics cup forming in combination said aperture closure and said phosphor light-conductive material.

* * * * *